United States Patent
Chang

(10) Patent No.: US 12,452,073 B2
(45) Date of Patent: Oct. 21, 2025

(54) OCULAR SELF-IMAGING HIGH-RESOLUTION OPTICAL COHERENCE TOMOGRAPHY SYSTEM AND METHODS

(71) Applicant: Grace C. Chang, Corona Del Mar, CA (US)

(72) Inventor: Grace C. Chang, Corona Del Mar, CA (US)

(73) Assignee: VIDEANT INC., Corona Del Mar, CA (US)

( * ) Notice: Subject to any disclaimer, the term of this patent is extended or adjusted under 35 U.S.C. 154(b) by 291 days.

(21) Appl. No.: 18/138,482

(22) Filed: Apr. 24, 2023

(65) Prior Publication Data

US 2023/0344636 A1 Oct. 26, 2023

Related U.S. Application Data

(60) Provisional application No. 63/333,903, filed on Apr. 22, 2022.

(51) Int. Cl.
*H04L 9/32* (2006.01)
*G16H 30/20* (2018.01)
*G16H 40/67* (2018.01)

(52) U.S. Cl.
CPC ........... *H04L 9/3231* (2013.01); *G16H 40/67* (2018.01); *G16H 30/20* (2018.01)

(58) Field of Classification Search
CPC ............................... G16H 40/67; G16H 30/20
USPC ........................................................ 713/186
See application file for complete search history.

(56) References Cited

U.S. PATENT DOCUMENTS

| 2004/0098343 | A1* | 5/2004 | Kawaki | G06Q 30/06 705/51 |
| 2016/0171186 | A1* | 6/2016 | Marking | H04L 63/126 713/189 |
| 2018/0271363 | A1* | 9/2018 | Scheibler | G01B 9/02054 |
| 2021/0127969 | A1* | 5/2021 | Oggenfuss | G01B 9/02091 |

(Continued)

OTHER PUBLICATIONS

International Preliminary Report on Patentability for International Application No. PCT/US2023/066122 dated Jan. 22, 2025.

(Continued)

*Primary Examiner* — Liang Che A Wang
(74) *Attorney, Agent, or Firm* — K&L Gates LLP

(57) ABSTRACT

Disclosed herein relates to a system deployed within a Cloud-based communication network, the system comprising: a computing device, comprising a processor coupled to a non-transitory computer-readable storage medium and configured to control a plurality of modules to execute instructions of the non-transitory computer-readable storage medium to obtain identifying information of a subject to whom an optical coherence tomography (OCT) device is prescribed, process the identifying information in accordance with one or more programmable threshold values, generate unique pattern data based on the identifying information in response to detect the identifying information exceeding the one or more programmable threshold values, encrypt the unique pattern data, and transmit encrypted unique pattern data to a computing server system.

22 Claims, 5 Drawing Sheets

(56) References Cited

U.S. PATENT DOCUMENTS

2022/0084197 A1    3/2022  Wyder et al.
2022/0122730 A1*  4/2022  Hayashi ................. G16H 40/67

OTHER PUBLICATIONS

International Search Report and The Written Opinion of the International Searching Authority for or International Application No. PCT/US2023/066122 dated Sep. 26, 2024.

* cited by examiner

OCULAR SELF-IMAGING HIGH-RESOLUTION OPTICAL COHERENCE TOMOGRAPHY SYSTEM AND METHODS

CROSS-REFERENCE TO RELATED APPLICATION

This application claims priority to U.S. Provisional Patent Application No. 63/333,903, filed Apr. 22, 2022, and entitled "OCULAR SELF-IMAGING HIGH-RESOLUTION OPTICAL COHERENCE TOMOGRAPHY SYSTEM AND METHODS," the contents of which are herein incorporated by reference.

FIELD OF TECHNOLOGY

The present disclosure generally relates to self-actuating and self-imaging high-resolution optical coherence tomography (OCT) system and methods, and more particularly relates to a self-imaging high-resolution OCT device and system configured to identify a subject to whom the OCT device is prescribed and provide real-time feedback to the subject with respect to a self-imaging process of the subject's eye(s).

BACKGROUND

OCT is a non-invasive imaging technique that is used in ophthalmology for viewing cross-sections of eye tissue. OCT can be used to image tissues in a subject's eye, including, but not limited to, the retina, cornea, optic nerve, and angles of the eye. Current commercially available OCT devices are for use solely in clinical office settings, and are operated only by trained medical technicians or professionals. The subject is seated in front of an OCT machine and places his/her head on a support of some sort (e.g., a chin rest) to keep it stable. The operator inputs the subject's identifying data into the machine, and chooses a particular software program with which to image the subject. The operator aligns the machine at the correct height for the subject's chosen eye to be imaged. The operator starts the program and images are obtained of the desired tissue(s) in the subject's eye(s). After images are obtained, the operator determines whether the images need to be re-taken (i.e., are of sufficient quality to be interpreted by a medical professional).

Because the number of subjects requiring OCT imaging during the course of their eye care is rapidly increasing, and there are not enough health care resources to provide the recommended frequency of OCT imaging to monitor progressive disease processes, accordingly, there is a need for a self-imaging OCT device and system, i.e., one in which the subject is also the operator and takes images of his/her own eyes, and which requires no trained medical personnel to operate. There is also a need for a device and system configured to identify and authenticate a subject to whom the OCT device is prescribed and provide real-time feedback to the subject with respect to a process of obtaining the self-images of the subject's eye(s).

SUMMARY

The example methods and system disclosed herein are directed ocular self-imaging high-resolution OCT. The methods and system use one or more configurations for imaging different areas of the eye including the retina, the cornea, the optic nerve, and the angles of the eye, amongst others. The device in this system differs from in-office devices in that operator and the subject are the same. There is currently no commercially available device in which this is the case. The subject actuates the disclosed device in order to self-image his/her own eye(s). The subject receives instructions and/or training (e.g., by a phone, by a visual or audio program on a display of the device, by written instructions, by someone in person) on how to set it up and operate it. It is electrically operated (AC or battery) and has an on-off switch. The device may be configured for ease-of-use by an elderly subject population. The device may be configured to provide audio or visual feedback to the subject to guide him/her through the self-imaging process. The device may be small enough to be portable.

The device disclosed herein differs from known devices in that the image self-acquisition is automated. For self-imaging with this device, other than stabilizing the head and looking at the fixation image, there are no other alignment tasks; the optical alignment within the system is automated in that a subject will not have to continuously re-position his/her eyes to maintain optical alignment within the system. The subsequent recording or obtaining of the images is automated. Furthermore, the time it takes to obtain the self-images will be only a few seconds (<10), rather than dozens of seconds or even minutes compared with known devices.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
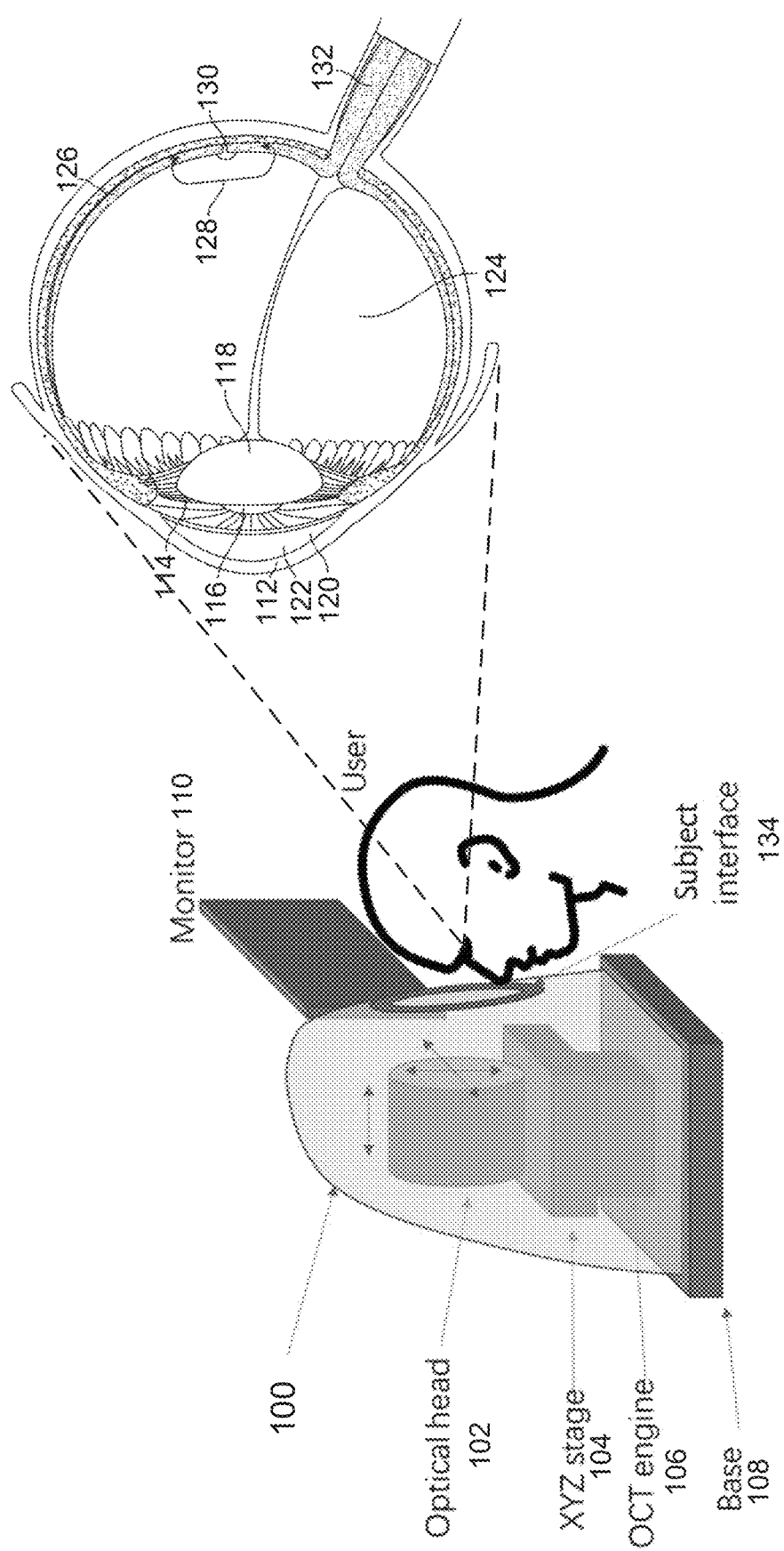
FIG. 1 is a diagram of an example self-imaging OCT device scanning a human eye, according to an example embodiment of the present disclosure.

The present disclosure relates in general to a method and apparatus for providing ocular self-imaging using a high-resolution OCT system. The disclosed device in this system differs from known self-imaging OCT devices in that this device is configured to produce comparatively higher resolution OCT images, comparable to commercial in-office devices, while being easy for a subject to use due to its automation. In some instances, the OCT device is configured to improve subject engagement regarding periodic imaging, which improves the monitoring of disease.

It should be appreciated that the disclosed device is configured for self-use by subjects in locations that are remote from physician. This may include, but is not limited to, at-home, in a retirement community, and/or a self-serve (or low service) clinic, a medical clinic, or entity such as a pharmacy or drug store. Further, the disclosed device may be portable.

In some embodiments, the device may be configured as or may include a self-imaging fundus camera or a device that is self-actuated to measure visual acuity. Moreover, in some embodiments, the device is configured to or may include the measurement of intraocular pressure (IOP). In some embodiments, the OCT device 100 may be configured to perform OCTAngiography (OCT-A).

The disclosed device also differs from known self-imaging devices in that additional specifications, such as image quality, field-of-view ("FOV") and others are greater (i.e., are best in class). Therefore, the disclosed device will be of greater use to practitioners in medical practice. Currently known self-imaging devices have inferior image quality, FOV, and other specs.

The disclosed device also differs from known self-imaging devices in that the refractive error range is larger, therefore allowing a greater range of subjects to use it.

The disclosed device also differs from known devices in that it will only be able to be actuated by the subject to whom the device is authorized or prescribed by a medical professional. Known devices do not, as far as it is known, offer this capability. The disclosed device may be configured to prevent other individuals (e.g., friends, relatives, visitors) from having their eyes imaged with the device without authorization (e.g., a prescription). Similarly, the images obtained are only of the subject(s) to whom the device is authorized. Should there be two (or more) members of the same household or other location, they may be able to use the same device by providing an identifier or other authentication. Conversely, should there be multiple devices 100 at a given location, a given subject may be able to use any one at any time. For example, multiple devices 100 may be installed at a medical care clinic (a primary care clinic, a specialty care clinic, an emergency care clinic, a mobile medical care unit, etc.) or across multiple entities such as a group of pharmacies and/or drug stores and a subject may be authorized to use any of the multiple devices 100 in accordance with a prescription and/or other authorization from a medical professional. As will be described fully below, information relating to the subject and the OCT measurement results of the subject's eye(s) may be associated with at least one identifier configured to uniquely differentiate and/or distinguish the subject from other users of the devices 100. Any OCT device 100 may be used by any authorized user at any time. No unauthorized user may be able to use any device.

The device is configured to generate OCT image data. OCT image data processing may occur within the device itself or external to the device within the system. The image data sent externally is Health Insurance Portability and Accountability Act of 1996 (HIPAA) compliant. The image data is analyzed (within the device itself or external to the device) to determine whether the image is sufficient, i.e., above a certain threshold of quality.

The disclosed device differs from known devices in that it provides subjects with real-time feedback (e.g., audio, visual) during the imaging session. The system will determine also whether the quality of the image is not sufficient, indicating the subject needs to repeat the self-image. The subject will be allowed several tries to obtain a useable image, above the threshold of quality. Further raw data image processing may occur internal or external to the device.

The disclosed device differs from known devices in that the device may also provide subjects with feedback (e.g., audio, visual) during the imaging session based on sensors within the device. The device may utilize information from the sensors to provide personalized guidance or instructions, and the subject may be asked to perform tasks during the session. For example, pressure or image sensors may detect head placement, and eye tracking sensors may detect eye position. Data from the sensors is used to determine if the device should prompt a subject to re-position their head and/or eye(s) for proper alignment to enable their eyes to be imaged. Additionally or alternatively, the data from one or more image sensors may be used to determine whether a subject has blinked as instructed. Blinking keeps the surface of the eye wet to enhance the optical clarity of the imaging pathway, which improves the image quality. If the device determines that a subject has not blinked when instructed, the device may request the subject to blink again and to hold his/her fixation for repeat imaging. If the subject blinked during the image acquisition, the device may ask the subject to blink and then hold his/her eye open for repeat imaging.

Image data (raw or processed) is sent via wireless network connections (e.g., Wi-Fi, cellular) to a cloud system. Image data may be further processed and analyzed. The processing and analysis may be done automatically (e.g., algorithms, artificial intelligence (AI), machine learning, deep learning, image registration, noise reduction, etc.) or manually by trained humans (e.g., ophthalmologists, optometrists and other trained medical professionals, readers in an imaging center). Imaging data and analysis and/or interpretation may be accessed by the subject's medical provider(s) and associates. Imaging data and analysis and/or interpretation may be accessed by the subject.

FIG. 1 is a diagram of an example self-imaging OCT device 100, according to an example embodiment of the present disclosure. The OCT device 100 includes an optical head 102 that is configured to display a fixation target, auto-correct the subject's refractive error to optimize the subject's view of the refraction target, and contain OCT imaging optics to support image acquisition. The OCT device 100 also includes an XYZ stage 104 configured to move in three-dimensions, such as along an x-axis, a y-axis, and a z-axis. The stage is configured to position the optical head in alignment with the subject's eye. In another embodiment, a joystick (e.g., mechanical or electrical) may be implemented to allow the subject to move the XYZ stage 104 in order to control the positioning of his/her head during an OCT measurement process.

The OCT device 100 also includes an OCT engine 106 that is supported by a base 108. The OCT engine 106 drives the device's imaging capabilities, and the technology may be spectral domain, swept-source or other. Associated software within or external to the device 100 analyzes image quality to determine if one or more images need to be re-taken.

The OCT device 100 is configured to require subject authentication prior to imaging the subject's eye. A monitor 110 may be communicatively coupled to the OCT device 100 to prompt a subject for authentication. In some instances, the monitor 110 may also provide step-by-step instructions for a subject to conduct a self-test. The monitor 110 may be integrated with the OCT device 100. In other embodiments, the monitor 110 may be separate from the OCT device 100 and communicatively coupled to the OCT engine 106 via a wired or wireless connection (e.g., Bluetooth®, Zigbee, Wi-Fi, etc.).

In some embodiments, the monitor 110 may include a laptop, a smartphone, a tablet or a desktop computer with internet connectivity. In these embodiments, the OCT device 100 may be connected to a server or Cloud system via the monitor 110. Alternatively, the OCT device 100 may be configured to connect directly to a network. In some embodiments, the monitor and the OCT engine 106 may have separate network connections. In these embodiments, the OCT engine 106 may provide a subject with instructions for associating the monitor within a same imaging session.

FIG. 1 also shows a simplified diagram of a human eye. Light enters the eye through the cornea 112. The iris 114 controls the amount of light to pass by varying the size of the pupil 116 that allows light to proceed to the lens 118. The anterior chamber 120 contains aqueous humor 122 which determines the IOP. The lens 118 focuses light for imaging. The focal properties of the lens 118 are controlled by muscles which reshape the lens 118. Focused light passes through the vitreous chamber, which is filled with vitreous humor 124. The vitreous humor 124 helps maintain the overall shape and structure of the eye. Light then falls upon the retina 126, which is photosensitive. In particular, the macula 128 is the area of the retina 126 responsible for receiving light in the center of the visual field. Within the macula 128, the fovea 130 is the area of the retina associated with the highest visual acuity. Light falling on the retina 126 generates electrical signals which are relayed through the optic nerve 132 to the brain for further processing.

Various disease processes leading to vision decrease may occur in structures of the eye such as the retina 126, causing it to become, for instance, too thick, too thin, distorted, detached, fibrotic, hemorrhagic, ischemic, etc. These disease processes may be detected and monitored through images obtained using OCT imaging technology. Problems in the blood flow through the vessels of the retina may be observed through OCTangiography (OCT-A), which is derived from OCT imaging technology.

The OCT device 100 of the present disclosure may be configured to include OCT-A capabilities, as well as to perform measurements including, but not limited to, ones such as determining thickness of the retina, and/or thickness of the layers within the retina. The OCT device 100 may also be configured to take photographic images of the eye, such as photography of the retina (fundus imaging), and to measure and monitor eye pressure (or intraocular pressure, IOP) for diseases such as glaucoma.

In some embodiments, the OCT device 100 of the present disclosure may allow a user to self-image his/her eye(s) in order for the progression of an ophthalmologic disease, such as macular degeneration or macular edema, to be tracked over time. As another example, a subject may self-image his/her eye(s) so that its response to a pharmaceutical or other treatment may be tracked over time.

The OCT device 100 of the present disclosure may be configured to include the following general features:
Method of Correct User Identification and Authentication (Hardware/Software)

As will be described fully below, the OCT device 100 may include user identification and authentication and/or identification hardware and/or software components. For example, the OCT device 100 may include physical hardware (e.g., a touchscreen and/or a monitor and keyboard to enter the subject's identifiers, and/or an actual lock and key mechanism for authentication), biometric (e.g., for facial recognition, iris pattern recognition, retina pattern recognition, fingerprint recognition, other tissue pattern recognition, voice recognition, bodily fluids, etc.), display enabled (e.g., on the display typing in a password/code, drawing a pattern) and may involve two-factor authentication of the subject.
Imaging Device Hardware:
Externally Visible:

A box with a subject interface (for placement of the face), with an external display, on a stable base. The device 100 includes an on/off switch. There will be an electrical cord whose end attaches to an electrical outlet.

Base (e.g., base 108 shown in FIG. 1): A platform which may be grossly adjusted up/down (manually, electronically): there may be mechanisms (e.g., buttons, knobs, levers) to actuate electrical components or manual components for adjustment of the height of the base.

Subject interface (e.g., subject interface 134 shown in FIG. 1): A support for the head/face which can be adjusted (e.g., by tilt) for best fit around face (manually, electronically).

Alignment tool: There may be a visual aid to assist the subject in grossly aligning his/her eye to the correct height, allowing the subject to adjust the base/subject interface.

Actuator: There may be an actuator such as a push button or lever or other mechanical actuator on the box, or a push button attached to a cord attached to the device (hand-held or placed near the device), or an image on the touch screen, or a pressure-sensitive area of the subject interface, or other interfaces, which allow the subject to begin the process of taking an image of his/her eye.

External monitor: A monitor or display which may be interactive (e.g., a touch screen). It may be integrated in a device which contains a CPU. It may be a display similar or the same as that of a wireless/smart phone or a tablet. It may have speakers.

External keyboard: There may be iterations which contain an external keyboard.
Within the Box:

Internal battery: there may be an internal battery as a power source.

CPU: There may be at least one central processing unit for data/image acquisition, image processing. It may or may not be integrated with the display (above).

Network capabilities: The device 100 may be configured to have Wi-Fi or cellular capabilities, which may or may not be integrated with a device which contains the CPU (e.g., phone, tablet, laptop, desktop).

Optical head (e.g., optical head 102 shown in FIG. 1): The optical head 102 may display a fixation target, and may contain OCT imaging optics to support image acquisition. The device 100 may correct the refractive error to optimize the view of the fixation target and OCT imaging. In one embodiment, the device 100 may be configured to perform auto-refraction, allowing for approximately +/−20D of refractive error; the device may scan through a range of refractive errors to find the best correction to optimize OCT image quality. If the subject's refractive error information is known, the refractive error for the subject may be directly set.

XYZ stage (e.g., XYZ stage 104 shown in FIG. 1): The XYZ stage may perform an automated alignment to center the pupil of the eye along optical path, to adjust the relative position of the optical head to the subject's eye.

OCT engine (e.g., OCT engine 106 shown in FIG. 1): The engine may be configured to drive the OCT imaging, with at least 20,000 axial scans per second capability and a field-of-view (FOV) of at least approximately 9 mm×9 mm (30 degrees) posteriorly, or a scan width of at least approximately 16 mm wide anteriorly; at least 1.5 mm imaging depth in tissue; 5 microns or better axial resolution in tissue; and center wavelength between 750 nm to 1100 nm. The duration of the scan, depending on the scanning pattern, may be approximately 10 seconds or less. In the embodiment shown in FIG. 1, the OCT engine 106 may be underneath the XYZ stage 104. In a different embodiment, both the OCT engine 106 and optical head 102 may be implemented on top of the XYZ stage 104. Or in another embodiment, the OCT engine 106 may be part of the optical head 102.

Additional sensors: The device 100 may have multiple iris cameras (or head monitoring sensors) monitoring the position of the subject's eye, which will lead to the movement of the XYZ stage 104 as needed to ensure the optical head 102 is always aligned to the center of subject's eye. The XYZ stage 104, together with the iris cameras (or head monitoring sensors) form a so-called "Alignment Unit." As will be described fully below, the iris cameras or head monitoring sensors may be connected to a processor (such as FPGA) to calculate the feedback information needed to guide the motion of XYZ stage 104 for alignment.

Software

Subject interface (e.g., subject interface 134 shown in FIG. 1): The subject may select the measurement protocol on the monitor in order to begin the process of self-imaging.

Subject instructions: A program offering visual/audio instructions to the subject may be displayed on the monitor 110/optical head 102 and/or produced by the speakers. Subject may receive additional feedback/instructions during the self-imaging by any of these modalities.

Fixation software: A visual fixation target is displayed within the optical head 102. The device 100 may generate signals to guide the subject to look at the fixation target. The visual fixation target may be an image or multiple images together at once or appearing sequentially, such as a movie, which may be displayed in a static or dynamic fashion. There may be auto-refraction, auto-x-y-z alignment, and image acquisition software.

Registration: Image feature recognition to ensure that the device 100 is obtaining the image in the same location as previous images so that any changes (e.g., disease progression) in the images can be followed over time.

Scan pattern: Capability of programming the desired scan pattern (radial, axial), along with repeat scanning over same area and averaging of images for improved resolution.

Image display: There may be en-face and volume displays along with measurements and heat maps.

Image quality determination: A measure of image quality for each image will be obtained. For example, software may be configured to determine whether the image quality measure falls above or below a certain threshold. This analysis may be done within the device itself or outside of the device, e.g., after it is uploaded to the cloud-based computing server 208. If it falls below a certain threshold, the device 100 may provide feedback and instructions to the subject (e.g., audio, visual) that the image needs to be retaken. The subject may be prompted to take a number of images in order to obtain a useable image.

Image processing: Additional image processing, e.g., segmentation involving algorithms, artificial intelligence, machine learning, deep learning, image registration, noise reduction, etc., may be done by software within the device 100 or on the cloud. In one embodiment, raw data and/or processed data obtained by the device 100 may be sent to the cloud-based computing server 208 for further analysis, processing, and/or storage.

Figure 2:
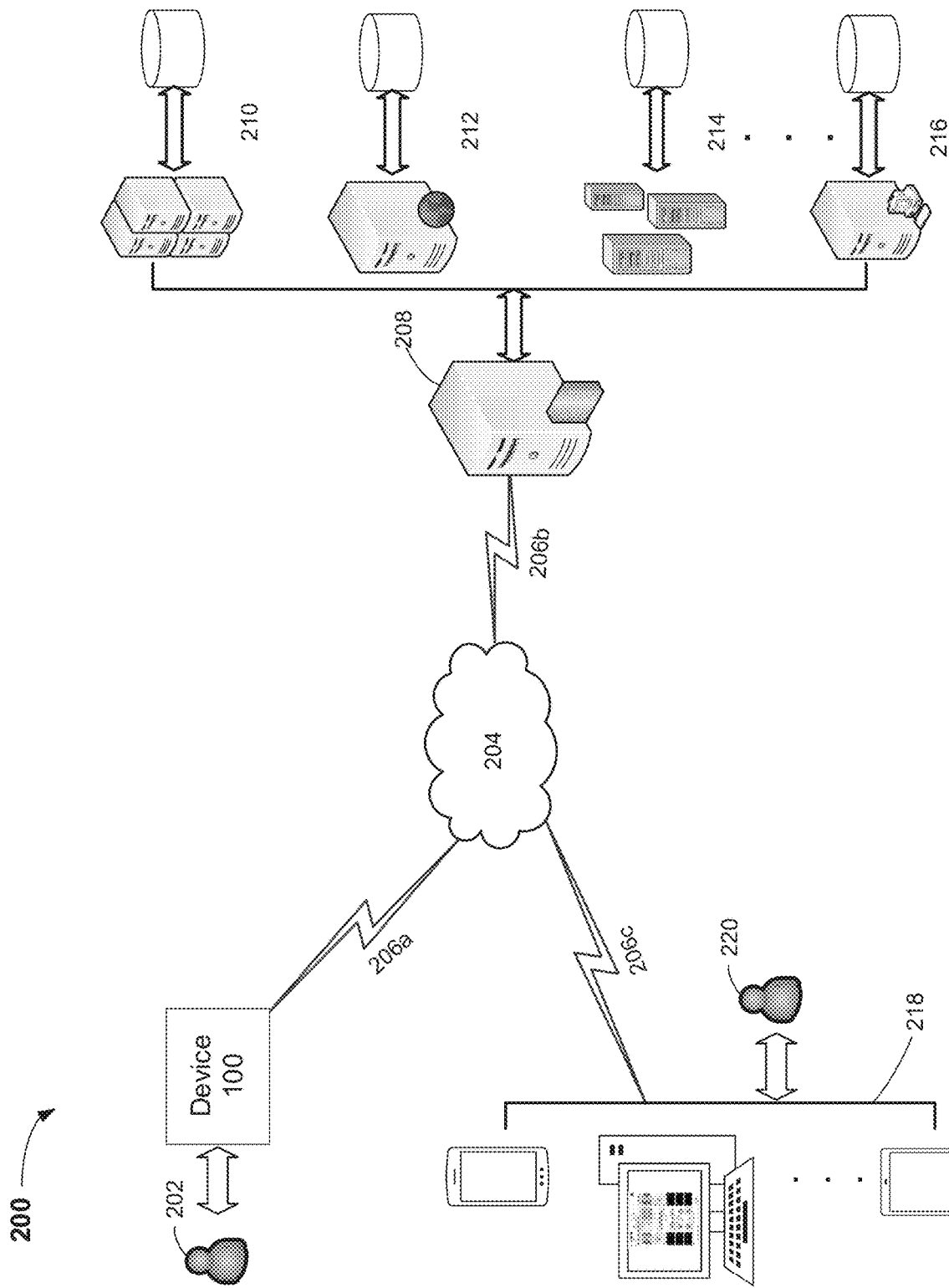
FIG. 2 is a diagram of a cloud-based system including the OCT device of FIG. 1, according to an example embodiment of the present disclosure.

FIG. 2 is a diagram of a cloud-based system 200 with the OCT device 100 of FIG. 1 deployed therein, according to an example embodiment of the present disclosure. A subject 202 may use the device 100 of FIG. 1, which is connected to a cloud-based computing server 208 via suitable communication protocol (e.g., 206a, 206b, 206c . . . 206n) and communication network 204. A communication network (e.g., communication network 204) may refer to a geographically distributed collection of computing devices or data points interconnected by communication links and segments for transporting signals and data therebetween. A protocol (e.g., protocol(s) 206a, 206b, 206c . . . ) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network. The cloud-based computing server 208 may generally include various processing hardware and process space(s), a corresponding storage medium such as a memory device or database, and, in some instances, a database application as is well known in the art. It should also be understood that "server system" and "server" are often used interchangeably. All services and functions of the present disclosure are provided in a HIPAA compliant digital interface.

The cloud-based computing server 208 of the present disclosure may provide various computing services using shared resources. Cloud computing may generally include Internet-based computing in which computing resources are dynamically provisioned and allocated to each connected computing device or other devices on-demand, from a collection of resources available via the network or the cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), extendible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Within the system 200, cloud computing resources accessible via the communication network 204 (e.g., Internet) may include a private cloud, a public cloud, and/or a hybrid cloud. Here, a private cloud may be a cloud infrastructure operated by an enterprise for use by the enterprise, while a public cloud may refer to a cloud infrastructure that provides services and resources over a network for public use. In a hybrid cloud computing environment which uses a mix of on-premises, private cloud and third-party, public cloud services with orchestration between the two platforms, data and applications may move between private and public clouds for greater flexibility and more deployment options. Some example public cloud service providers may include Amazon (e.g., Amazon Web Services® (AWS)), IBM (e.g., IBM cloud), Google (e.g., Google cloud Platform), and Microsoft (e.g., Microsoft Azure®). These providers provide cloud services using computing and storage infrastructures at their respective data centers and access thereto is generally available via the Internet. Some cloud service providers (e.g., Amazon AWS Direct Connect and Microsoft Azure ExpressRoute) may offer direct connect services and such connections typically require users to purchase or lease a private connection to a peering point offered by these Cloud providers.

The cloud-based computing server 208 may comprise a management computing device/interface (not shown) configured to connect with a plurality of devices 100 used by on-boarding subjects and $3^{rd}$ party and/or proprietary software systems, computing platforms or systems 210, 212, 214 and 216 to process various received requests and deliver requested data and services. Such a management computing device/interface may include an application programming interface (API) or a plurality of APIs configured to handle protocol translation, service discovery, basic business logic, authentication and security policy enforcements, stabilization and load balancing, cache management and various monitoring, logging and analytics functions.

In accordance with aspects of the present disclosure, the OCT device 100 may be configured to connect to one or more APIs of the cloud system 200 to send one or more images of a subject's eye and provide, in real-time, feedback (audio, visual) to the subject in the process of obtaining an image of the eye in response to detecting that the eye or head positioning of the subject needs to be adjusted.

In one embodiment, the device 100 may be configured to provide instructions (audio signals via speakers, or visual signals displayed on the monitor 110 or the optical head 102) to the subject 202 about placing his/her head in headrest/chinrest of the device 100. Thereafter, the cameras or sensors in headrest/chinrest may generate signals to indicate whether the subject's positioning is appropriate.

In one embodiment, the device 100 may include multiple vision cameras and infrared light sources configured to calculate and track the orientation of a subject's eyes. For example, the device 100 may include two high-resolution machine vision cameras (e.g., two USB 3.0 cameras each with pixel size 5.5×5.5 μm) positioned apart (e.g., about 12 cm apart) with their optical axes directed toward the location of the subject' eyes. The device 100 may also include infrared illuminators (e.g., two 850-nm infrared illuminators), each being positioned near the cameras. In one example implementation, a first illuminator may be placed to the right of the right camera (e.g., 6 cm apart), and a second illuminator may be placed to the left of the left camera (e.g., 6 cm apart). The temporal resolution of the cameras may be depended on their spatial resolution settings. For example, the cameras of the device 100 may be configured to film at 180 frames per second (fps) for spatial resolution of 2,044×1,088 pixels, and 380 fps at 1,048×480 pixels. Infrared-passing filters for filtering out wavelengths greater than 720 nm may be added on the lenses of the cameras to block light in the visible spectrum. Subsequently, a calibration procedure may be performed in which images of a calibrated checkerboard pattern may be taken while it is moved around the cameras at various angles in order to obtain parameters of the cameras. This calibration procedure may correct for lens distortions and express the image coordinates in both cameras using a right-handed Cartesian coordinate system with its origin located at the nodal point of one of the cameras. The x- and y-axis of the coordinate system are parallel to the image plane of this camera, and the positive z-axis pointed away from it (i.e., toward the subject). Next, the 3-D positions of the illuminators and the position and orientation of a screen may be determined via suitable means (e.g., triangulations). Such a screen is generally used for converting image features of the eyes into estimates of the point of gaze. As a result, coordinates of the images captured by the vision cameras of the device 100 may be automatically converted into the right-handed Cartesian coordinate system using the parameters obtained from the calibration procedure.

Subsequently, the OCT device 100 may be configured to record the positions of each illuminator at opposite cameras when the subject's eye is perfectly aligned with a fixation target based on the triangle relationships between the infrared light sources and the cameras. The fixation target is a visual target for fixating the subject's eye, and is used when photographing a fundus or OCT measurement. One or more light emitting diodes (LEDs) may be used as imaging or observation light sources and by monitoring the LED movements or new locations at the cameras, the device 100 may determine how much a subject's eye and the optical axis of the eye is deviated (e.g., up or down) from the center of the system, and whether the eye is too far or close (left or right) from the focal position. The positional information regarding the LEDs may also be used to guide the motions of the XYZ stage 104 to re-align the device 100 to subject's eye.

Based on the size of the subject's pupil (e.g., 3 mm) and accuracy of focus required (e.g., in the sub-mm range), the system 200 of the present disclosure may determine a threshold of allowed offsets of the LED positions compared to calibration. If the detected LED positions align with the calibration within the threshold, the system 200 may determine that the head position/eye position of the subject is appropriate. Alternatively, based on the detected offset values and the triangular relationships between the light sources and the cameras, the system 200 may be configured to drive the XYZ stage 104 to further align the system 200 to the subject's eye.

In one aspect, the device 100 may be configured to generate feedback (audio, visual) in real-time to the subject with respect to detected head and eye positions. For example, audio or visual instructions may be generated to guide the positioning process. The subject may be instructed to look at an image, look straight ahead, blink the eye, hold the eye open for several seconds, etc. The cameras and sensors of the device 100 may be configured to continuously detect the positions of the subject's head and eye and generate signals to indicate whether the positioning is appropriate.

The device 100 may be configured to align the measurement head (e.g., optical head 102 of FIG. 1) to a first eye of the subject. In one embodiment, the device 100 may be configured to determine the closest eye of the subject in order to start scanning. For example, the device 100 may be configured to obtain an image of the face of the subject in response to detect that the subject has placed his/her head in the headrest/chinrest of the device 100. The image of the face may be partitioned into a left visual field and a right visual field relative to a central fixation pattern (e.g., a central starting fixation dot) and midline plane. Further, multiple areas of interest may be identified for a number of facial features of the subject such as the right and left eyes, bridge of nose (i.e., middle of eye region), right and left half of nose, and right and left half of mouth. The positions of these identified areas of interest along the y-axis in both visual fields and the central starting fixation dot share the same y-coordinate component. Subsequently, the midline of each area of interest may be determined with respect to the central starting fixation dot and the midline plane along the x-axis in order to identify the nearest eye, nearest half-nose, and nearest half-mouth. The color of the central starting fixation dot may be configured to change successively from red to yellow to green in order to signal to the subject that a maintained fixation was successfully detected at the start position. The device 100 may further include an accelerometer or gyroscope to determine which eye is measured in response to an orientation of the housing of the device 100.

In another embodiment, the device 100 may be configured to start measurement of a selected eye of the subject (e.g., the left or right eye of the subject). In yet another embodiment, the device 100 may be configured to scan only one eye of the subject based on e.g., the prescription by a medical practitioner.

Next, an auto-refraction procedure may be performed by the device 100 on a first eye of the subject. An OCT imaging process generally relies upon directing waves to the subject's eye tissue under examination, where the waves echo off the eye tissue structure. The back reflected waves may be analyzed and their delay may be measured to reveal the depth in which the reflection occurred. The delays of the back-reflected waves cannot be measured directly, so a reference measurement is used. Through the use of an interferometer, part of the light is directed to a sample arm (i.e., the subject's eye) and another portion is sent to a reference arm with a well-known length (e.g., a mirror). The combination of reflected light from the sample arm and reference light from the reference arm gives rise to an interference pattern, but only if light from both arms have traveled the same optical distance. For example, by scanning the mirror in the reference arm, a reflectivity profile of the sample may be obtained (time domain OCT). Areas of the subject's eye under examination that reflect back a lot of light may create greater interference than other areas. This reflectivity profile, called an A-scan, contains information about the spatial dimensions and location of structures within the subject's eye. To create a cross-sectional image (or B-Scan), the sample beam is scanned laterally across the subject's eye.

The device 100 of the present disclosure may be configured to adjust the OCT delay to identify the OCT image of the subject's eye. Additional contrast may be provided by measuring and evaluating the change of polarization state of the backscattered probe light due to the interaction with the subject's eye under examination. The device 100 may be configured to optimize the polarization of the OCT imaging process. Further, the best OCT beam focus may be determined by adjusting the distance between the sample arm collimator lens and the sample arm fiber tip. If the auto-refraction procedure fails to identify the OCT image, the device 100 may generate instructions to inform the subject (audio, visual) to repeat the aforementioned process.

An auto-image acquisition procedure may be performed by the device 100 on first eye in response to detect that the auto-refraction procedure locates the OCT image of the subject's eye. A pre-determined scan pattern of the device 100 may be used for the image acquisition. The manufacturer signal quality index (MSI) of the device 100 may provide the reviewing physician an objective and quantitative indication of image quality for clinical interpretation. For example, the signal quality index for each B-scan (MSIB) may be calculated by the device 100 based on retinal signal intensity and noise characteristics. The quality index for the entire volume scan may be calculated based on the mean MSIB of all the eligible B-scans in the volume scan. A MSI or MSIB may have a scale is from 0 (no visible retinal signal) to 7 (good). If an image is not of acceptable quality, the device 100 may be configured to generate instructions to inform the subject (audio, visual) to repeat the aforementioned process.

If the image is determined to be acceptable, the optical head 102 of the device 100 may align to a second eye of the subject in order to perform the aforementioned auto-refraction and auto-image acquisition procedures for the second eye. In one embodiment, the device 100 may be configured to obtain and analyze measurement results of the auto-refraction and auto-image acquisition procedures in real-time and generate instructions to the subject to repeat specific testing steps (e.g., 3 times or any selected number of times) in order to obtain quality OCT images of the subject's eyes. The device 100 may be configured to generate instructions to inform the subject (audio, visual) if the self-imaging session is successfully completed for both eyes of the subject.

In another embodiment, the device 100 may be configured to transmit the measurement results of the auto-refraction and auto-image acquisition procedures to the cloud-based computing server 208 for quality assessment. For example, the cloud-based computing server 208 may be connected with one of the computing platforms or systems 210, 212, 214 and 216 to implement deep learning algorithm to analyze any measurement results obtained during the self-imaging process in real-time. The device 100 may be configured to receive assessment results from the cloud-based computing server 208 and generate signals accordingly to guide the self-imaging process of the subject.

As will be described fully below, the device 100 may include an interface for receiving images in conjunction with an identifier of a subject and/or an identifier of the OCT device 100. In other embodiments, the identifier(s) is/are included as metadata for the transmitted images.

The OCT device 100 may transmit raw or processed image data to the cloud-based computing server 208. The OCT device 100 and the cloud system 200 may use open standards (e.g., FHIR, DICOM) for data transmission. The image data and other health information is configured to be secure and HIPAA compliant. Industry-standard identity and access management will be used. Designated physician(s)/investigator(s) and associated staff 220 may have access to the data via a suitable computing device 218. The subject 202 may have access to his/her data.

Further processing may be performed by the cloud-based computing system 200 after the data is uploaded. As shown in FIG. 2, system 200 may be configured to provide a user interface on a computing device or mobile device 218 for physicians/investigators and associated staff 220 to view OCT images and measurements of the subject acquired by the device 100. The subject 202 may be configured to access the OCT images and measurements as well. Data may be downloaded to and viewed on a computing device or mobile device 218 for further analysis (e.g., at least one of the $3^{rd}$ party and/or proprietary software systems, computing platforms or systems 210, 212, 214 and 216). The computing device may generally refer to an electronic device that can perform substantial computing including arithmetic operations and logic operations and the mobile device may generally refer to any suitable portable handheld computing device such as a smartphone, a tablet computer, a laptop, or a personal digital assistant. It should be appreciated that the designated physician(s)/investigator(s) and associated staff 220 may obtain the OCT images and measurements of the subject's eye(s) at any location where there is a suitable computing device or mobile device 218. Furthermore, the designated physician(s)/investigator(s) and associated staff 220 may use any suitable desktop computer and mobile device 218, along with the computing platforms or systems 210, 212, 214 and 216 within the cloud system 200 to remotely set and change imaging/scanning parameters of the OCT device 100 for any given subject. For example, the physician may change the scanning pattern of the OCT device 100 (e.g., radial vs raster scan patterns), may choose whether or not to perform image averaging and how many repeated images to obtain and average over a given area, the number of A-scans per B-scan, or the number of B-scans per C-scan, etc.

In accordance with important aspects of the present disclosure, the physician may use a mobile device (e.g., one of the computing devices 218) to obtain at least the OCT images and measurements of the subject's eye(s) obtained by the device 100 from the cloud-based computing server 208. For example, the physician may instantiate an OCT self-imaging application (not shown) via a touch-sensitive display of the mobile device 218 to access and retrieve the OCT images of the subject's eye(s) and/or other OCT measurement data of the subject saved on the cloud-based computing server 208. In one embodiment, the cloud-based computing server 208 or the OCT self-imaging application may generate a timeline to arrange and display multiple OCT images of the subject's eye(s) taken within a selected period of time, such that the physician may scroll through the OCT images for comparison and/or tracking the progression of an ophthalmologic condition. In another embodiment, the OCT self-imaging application of the mobile device 218 may be configured to provide data exchange and communication (e.g., texts, calls, emails, or video conferences) between field staff, offices, clinics, and physicians to guide the OCT measurement process of the subject or facilitate peer review. Further, the physician may use the OCT self-imaging application of the mobile device 218 to remotely set and change imaging/scanning parameters of the OCT device 100 for any given subject. For example, the physician may change the scanning pattern of the OCT device 100 (e.g., radial vs raster scan patterns), may choose whether or not to perform image averaging and how many repeated images to obtain and average over a given area, the number of A-scans per B-scan, or the number of B-scans per C-scan, etc. In yet another embodiment, the OCT self-imaging application of the mobile device 218 may be configured to download at least one OCT image of the subject's eye to the local memory of the mobile device 218, such that the physician may focus on specific regions of the image for diagnosis purposes. Physician notes and reports may be drafted and prepared via the OCT self-imaging application as well using various interface components of the mobile device 218. For example, the physician may type in observation notes via a keyboard of the mobile device, or dictate written reports via a voice recognition module. The physician may also use the mobile device 218 to access an artificial intelligence based diagnostic system or an expert or knowledge based diagnostic or evaluation system that is connected to the cloud-based computing server 208 for further analyzing the OCT images of the subject's eye(s). In addition, the OCT self-imaging application 422 may allow the physician to upload information (e.g., analysis notes and reports) related to the OCT images of the subject's eye(s) to the cloud-based computing server 208. Such information may be securely stored on a local storage medium of mobile device 218 or incorporated into the subject's medical chart and record saved in an electronic medical/health record system (e.g., one of the systems 210, 212, 214 and 216) based at least upon the identifying information of the subject and/or the OCT device 100.

Figure 3:
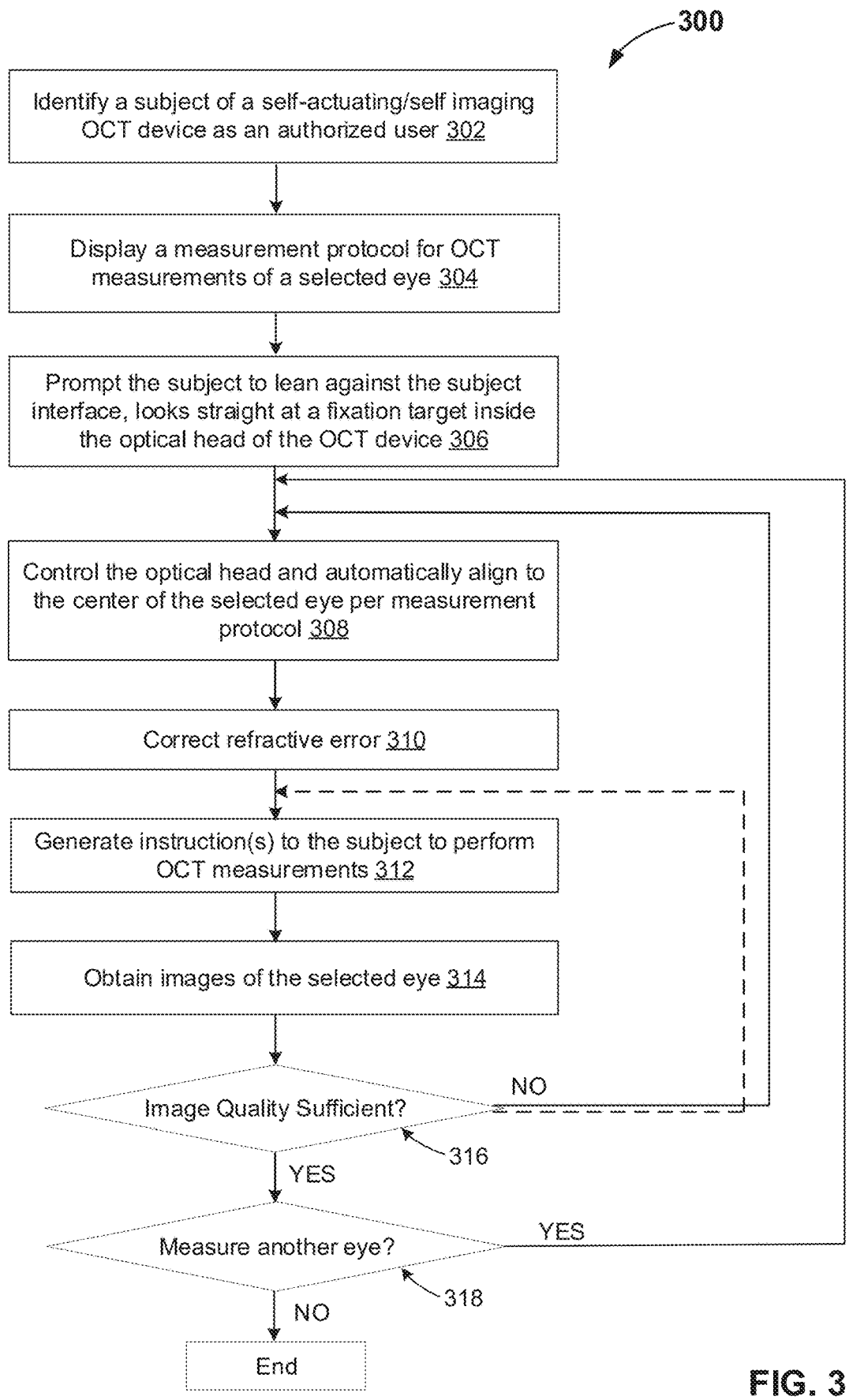
FIG. 3 is a diagram of a flowchart for using the OCT device of FIG. 1 to obtain one or more images of a subject's eyes, according to an example embodiment of the present disclosure.

FIG. 3 illustrates a flowchart 300 for using the OCT device 100 of FIG. 1 to obtain one or more images of subject's eyes, according to an example embodiment of the present disclosure. The flowchart 300 may begin by the OCT device 100 identifying (302) a user as an authorized subject. This may include authenticating a user. Next, the OCT device 100 may be configured to display (304) one or more measurement protocols via the monitor 110 of the device 100. In some embodiments, the measurement protocols are transmitted to the OCT device 100 via the cloud system 200 from a physician's computer 218, as shown in FIG. 2. The measurement protocols may be periodically updated.

Next, the OCT device 100 may be configured to prompt (306) the subject to lean forward against the subject interface 134 and look at a fixation target within the optical head 102. The XYZ stage 104 may control (308) the optical head 102 to move up and down, left and right, forward and backward, etc. to automatically align with the center of the subject's pupil in accordance with the selected measurement protocol. The OCT engine 106 may also correct (310) for the refractive error of the subject's eye in order to optimize the view of the fixation target for OCT imaging. The OCT device 100 may be configured to generate instruction(s) (312) (audio, visual) during the OCT measurement. For example, the OCT device 100 may prompt the subject to blink his/her eye three times, for example. Afterwards, the OCT device 100 obtains (314) images of the subject's eye. The OCT device 100 and/or the cloud-based computing server 208 of the system 200 may be configured to determine (316) if the image quality is sufficient. If the image quality is not sufficient, the OCT device 100 may be configured to generate additional instruction(s) to the subject to repeat the OCT measurements. For example, the OCT device 100 prompts the subject to blink his/her eyes and retake the OCT images.

If the image quality is determined (316) to be sufficient, the OCT device 100 determines (318) if the images of the subject's other eye are to be obtained per the selected measurement protocol. In which case, the aforementioned procedure may be repeated for the other eye. In some embodiments, the OCT device 100 may be configured to prompt a subject to focus his/her left or right eye on a fixation target before obtaining images. The OCT device 100 may be configured to confirm that images are obtained of the subject's left or right eye. If no further images are needed, the flowchart 300 ends. In some instances, the OCT device 100 may perform analyses of the images. The OCT device 100 may transmit the obtained images to the cloud-based computing server 208 for further analysis.

Figure 4:
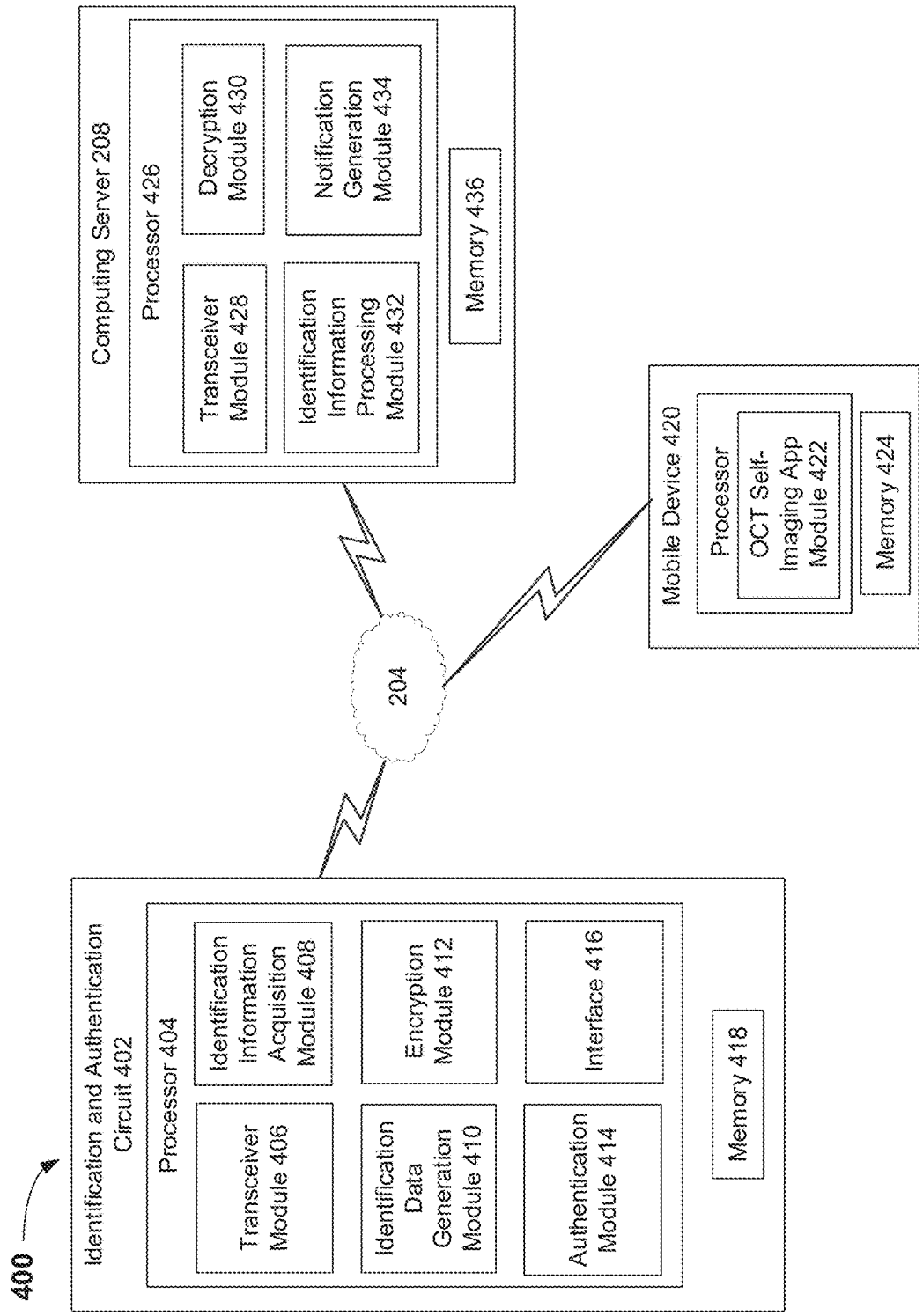
FIG. 4 is a diagram illustrating how to identify and authenticate the subject to whom the OCT device of FIG. 1 is prescribed, according to an example embodiment of the present disclosure.

In accordance with aspects of the present disclosure, the self-actuating and self-imaging high-resolution OCT device 100 may only be used by a subject to whom the device 100 is prescribed by a medical professional. FIG. 4 illustrates an identification and authentication systematic diagram 400 where a subject may be identified and authenticated to use the device 100 via at least one identification and authentication circuit 402. In one embodiment, circuit 402 may include at least one processor 404 configured to control and execute a plurality of modules including a transceiver module 406, an identification information acquisition module 408, an identification data generation module 410, an encryption module 412, an authentication module 414, and an interface 416. The term "module" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A module may also be implemented as a combination of the two, with certain functions facilitated by hardware alone, and other functions facilitated by a combination of hardware and software. Each module may be realized in a variety of suitable configurations, and should not be limited to any example implementation exemplified herein. The identification and authentication circuit 402 may be part of the device 100 or implemented as a stand-alone module or device (e.g., a part of a mobile device 420 used by the subject or a stand-alone computing device deployed within the communication network 204) configured to communication and exchange data with the device 100 via the communication network 204 and suitable communication protocols.

For example, the circuit 402 may be part of a computing device releasably attached to the main body of the OCT device 100 and include a fingerprint scanner for obtaining images of, e.g., one or more fingers of the subject for authentication and identifying purposes. In another embodiment, a card scanner (e.g., a slot or compartment) may be implemented to scan information stored in an identification card, key fob, barcode etc. uniquely identifying the subject. In addition to various electronic self-actuating approaches that may be implemented by the circuit 402, an actual lock and key mechanism may be used by the subject for actuating the device 100. A programmable electronic lock system may also be implemented.

In yet another embodiment, the device 100 may be configured to incorporate the identification and authentication circuit 402 and the scanning components mentioned above. For example, the device 100 may include a touch-scanner (e.g., interface 416 of the circuit 402 or monitor 110) incorporated into the body of the OCT device 100 to evaluate fingerprints or other identifying information obtained from the subject via the circuit 402. Such a touch-screen may be further configured to prompt the user to type in a password on a keyboard shown on the screen, or on a keyboard separate (wireless or wired) from the touch-screen.

The transceiver module 406 of the identification and authentication circuit 402 may be configured by processor 404 to exchange various information and data with other computing devices deployed with the communication network 204 (e.g., computing server 208). For a first time registration, the subject 102 may open the interface 416 (e.g., a graphical user interface (GUI)) of the circuit 402 or the OCT self-imaging application 422 on the mobile device 420. Identification information acquisition module 408 may be configured by processor 404 to obtain or extract measurable biological or behavior characteristics for the purpose of uniquely identifying or authenticating the subject actuating the device 100. In one aspect, the circuit 402 and/or the device 100 may be configured to obtain unique biometric or non-biometric characteristics of the subject including but not limited to a fingerprint, a palm/finger vein pattern, a voice pattern, a facial image, a palm print, a hand geometry, a retina and iris recognition, a digital signature, a username and password, or a token. The identification information acquisition module 408 may include a touch sensor and corresponding circuitry configured to record a series of images of the subject's fingerprint (e.g., single finger, or multi-finger, and/or palm). Alternatively, module 408 may include a voice recognition software trained by having the subject repeat certain commands, statements, or sentences multiple times to determine a voice pattern of the subject. In one embodiment, module 408 may include image sensing circuitry (e.g., at least one camera or the camera associated with the mobile device 420) configured to record the subject's retina and iris pattern or any suitable facial features from multiple angles to derive a biometric optical signature. For example, circuit 402 may be configured to provide instructions (audio signals via speakers, or visual signals displayed on the monitor 110 or the optical head 102) to the subject about placing his/her head in headrest/chinrest of the device 100. Thereafter, the cameras or sensors in headrest/chinrest may generate signals to indicate whether the subject's positioning is appropriate. The subject may then be instructed to look at an image, look straight ahead, blink the eye, hold the eye open for several seconds, etc. The cameras and sensors of the module 408 may be configured to continuously capture images of the subject's eye.

Processor 404 may be configured to perform a real-time quality analysis of captured biometric and/or non-biometric data of the subject using one or more programmable quality threshold values. In response to detecting that the captured biometric and/or non-biometric data of the subject fail to exceed the predetermined quality parameters, the identification information acquisition module 408 may be configured to provide instructions (audio, video) to the subject to repeat the measurement process. Processor 404 may encode or compress raw data captured by identification information acquisition module 408 and perform filtering, edge correction, edge enhancement or similar data processing to enhance data quality.

Subsequently, identification data generation module 410 may be configured to generate unique pattern data based at least on the raw or enhanced biometric or non-biometric data of the subject. The output of module 410 may include a digital, mathematical and/or geometrical representation of the input data obtained from module 408 for uniquely identifying the subject. For example, module 410 may be configured to detect at least one feature point in captured images of fingerprints of the subject, such as the topmost point of the innermost ridge lines of a specific finger, or a point with highest curvature. Subsequently, minutia points (e.g., 40-100) of each fingerprint may be extracted by taking the feature point as reference and a binary image may be generated such that each pixel is represented as a single bit (0 or 1). Next, module 410 may be configured to reduce the amount pixels in the binary image by removing all redundant pixels and produce a new simplified image with the minimum number of pixels possible. Additional processing may be carried out to determine a region of interest and unique minutiae which may be represented as a matrix. A unique identifier (a quick response code, or a bar code) of the subject may be generated by module 410 based at least on the matrix.

In an additional embodiment, identification information acquisition module 408 may be configured to obtain a unique code or identifier of the device 100. For example, Bluetooth personal area network (PAN) may have unique identifiers associated with any connected Bluetooth device. Similarly, each LAN device that operates an IEEE 802.11 or IEEE 802.16 device may have a MAC identifier. In a cellular telephone network, each device compatible with the network may have an Electronic Serial Number (ESN) that is unique to the device. Other wireless systems may have other device identification schemes.

For additional security, information relating to biometric or non-biometric data of the subject and the unique identifier of the device 100 may be encrypted by encryption module 412. Example encryption methods may utilize random number generators, secure hashing algorithm (SHA-1, SHA-2, or SHA-3), message digest (MD2, MD5), DES (e.g., Digital Encryption Standard), 3DES (e.g., Triple DES), rivest cipher (e.g., RC4), ARC4 (e.g., related to RC4), TKIP (e.g., Temporal Key Integrity Protocol, uses RC4), advanced encryption standard (AES), RSA, DSA, DH, NTRU, and elliptic curve cryptography (ECC), private key authentication (PKA), Device-Unique Secret Key and other cryptographic key data, SSL, serpent, twofish, blowfish, and international data encryption algorithm (IDEA). Encrypted data may be stored on memory 418, or transmitted by transceiver module 406 via the communication network 204, to the storage database/memory 434 of, e.g., computing server 208 on the cloud or on any other storage database associated with the $3^{rd}$ party and/or proprietary software systems, computing platforms or systems 210, 212, 214 and 216. As a result, the subject and/or the device 100 may become registered with the computing server 208.

In some embodiments, a biometric authentication or multi-factor authentication of the subject via the authentication module 414 may be performed. For example, one of the $3^{rd}$ party and/or proprietary software systems, computing platforms or systems 210, 212, 214 and 216 may be configured to provide a multi-factor authentication service to the subject and/or device 100 via the cloud-based computing server 208. An authentication method using some of the subject's biometric characteristics may be implemented. For example, the subject may use an imaging module of the circuit 402 or the mobile computing device 420 to capture an image of his/her face, iris, retina, or an image of his/her fingerprint, a digital recording of his/her voice, etc., which may be used to create a biometric image or pattern to be authenticated against a registered pattern of the subject.

Memory 418, which is coupled to the processor 404, may be configured to store at least a portion of information obtained by the identification and authentication circuit 402. In one aspect, memory 418 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., one or more caches) configured to store the at least one instruction. The term "machine readable medium" may include any medium that is capable of storing, encoding, or carrying instructions for execution by all modules of the circuit 402 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

As further shown in FIG. 4, computing server system 208 may include at least one processor 426 configured to control and execute a plurality of modules including a transceiver module 428, a decryption module 430, an identification information processing module 432, and a notification generation module 434. Memory 436, which is a non-transitory machine readable medium coupled to the processor 426, may be configured to store at least information related to registered users and OCT devices prescribed to the registered users and at least one set of data structures or instructions (e.g., software) embodying or utilized by at least one of the techniques or functions described herein.

Specifically, decryption module 430 may be configured to decrypt received signals by transceiver module 428 from the identification and authentication circuit 402, the device 100, and/or the mobile device 420 to extract the information uniquely identifying the subject and/or the device 100.

In some embodiments, the identification information processing module 432 of computing server 208 may be configured to use the decrypted information to determine if a detected subject and device 100 match any information stored in the memory 436. Only identified subjects may be allowed to use the device 100 to subsequently carry out OCT measurements. An unauthorized user of the device 100 may be denied from using the device 100 and/or accessing the system 200. Notification generation module 434 may be configured to generate signals (audio or visual) to indicate whether the subject is authorized to use the device 100 accordingly.

As described previously, identification data generation module 410 of the circuit 402 may be configured to extract certain biometric features from the captured image, and generate a geometric or mathematical representation, or a biometric template which is a digital reference of distinct characteristics that have been extracted from a biometric sample, of the subject.

In one embodiment, the biometric template may be time-stamped, so it is valid for a limited period (e.g., several minutes) and encrypted by the encryption module 412 for additional security. This encrypted template may be used to match against registered biometric patterns. This matching may be performed locally on the circuit 402 against a template that has been registered and securely stored on memory 418. Alternatively, the biometric template may be transmitted to remote data repository system(s) associated with e.g., the computing server 208 or one of the 3$^{rd}$ party and/or proprietary software systems, computing platforms or systems 210, 212, 214 and 216 where biometric patterns of registered users are maintained for comparison purposes.

If a comparison of the biometric template and a registered template shows that the similarity is above a predetermined threshold value, the subject and/or device 100 is positively authenticated, and the subject may use the device 100 to perform OCT measurements. However, if the subject is not positively authenticated, the system 200 of the present disclosure may be configured to disable or lock the device 100 to prevent the authorized user from carrying out OCT measurements via the device 100.

In some embodiments, the device 100 may be configured to transmit the OCT measurement data (e.g., metadata and clinical imagery) and the identifying information of the subject and/or device 100 to the cloud-based computing server 208. In one aspect, computing server 208 may be connected with an electronic medical/health record system (e.g., one of the systems 210, 212, 214 and 216), such that the OCT measurement data of the subject may be incorporate into the subject's medical chart and record based at least upon the identifying information of the subject and/or the OCT device 100.

Figure 5:
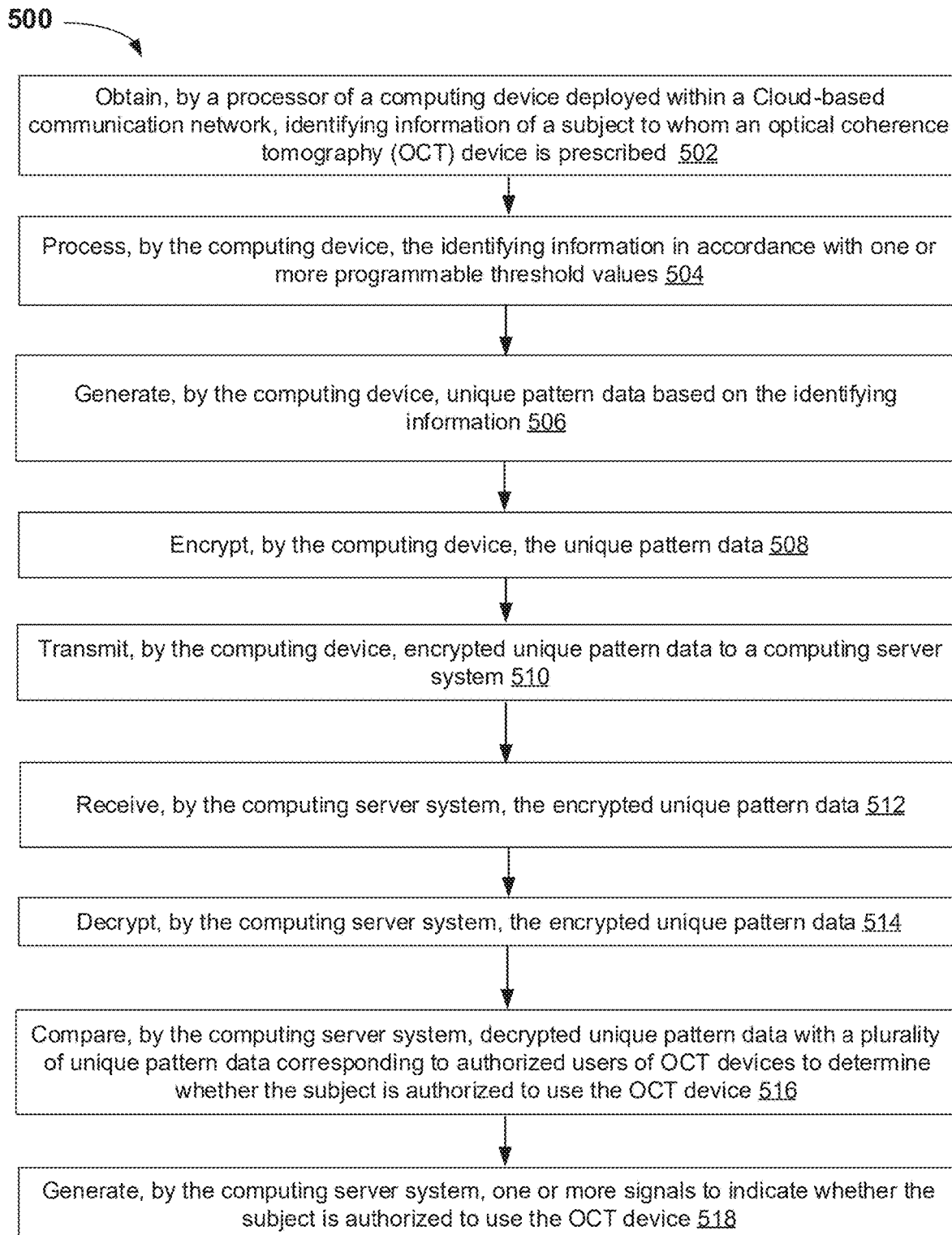
FIG. 5 is a flowchart illustrating how to identify and authenticate the subject to whom the OCT device of FIG. 1 is prescribed, according to an example embodiment of the present disclosure.

FIG. 5 shows an example method 500 implemented by the system of FIG. 2, according to aspects of the present disclosure. Method 500 may include obtaining (502), by a processor of a first computing device deployed within a cloud-based communication network, identifying information of a subject to whom an optical coherence tomography (OCT) device is prescribed. Method 500 may continue with processing (504), by the first computing device, the identifying information in accordance with one or more programmable threshold values; and generating (506), by the first computing device, unique pattern data based on the identifying information in response to detect the identifying information exceeding the one or more programmable threshold values.

Method 500 may also comprise encrypting (508), by the first computing device, the unique pattern data; and transmitting (510), by the first computing device, encrypted unique pattern data to a computing server system.

Method 500 may additionally include receiving (512), by the computing server system, the encrypted unique pattern data from the first computing device; decrypting (514), by the computing server system, the encrypted unique pattern data; comparing (516), by the computing server system, decrypted unique pattern data with a plurality of unique pattern data corresponding to authorized users of OCT devices to determine whether the subject is authorized to use the OCT device; and generating (518), by the computing server system, one or more signals to indicate whether the subject is authorized to use the OCT device.

In various aspects, the systems and methods described herein may be implemented in hardware, software, firmware, or any combination thereof. In the interest of clarity, not all of the routine features of the aspects are disclosed herein. It will be appreciated that in the development of any actual implementation of the present disclosure, numerous implementation-specific decisions may be made in order to achieve the developer's specific goals, and that these specific goals will vary for different implementations and different developers.

Furthermore, it is to be understood that the phraseology or terminology used herein is for the purpose of description and not of restriction, such that the terminology or phraseology of the present specification is to be interpreted by the skilled in the art in light of the teachings presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system deployed within a communication network, the system comprising:
   a first computing device, comprising:
      a non-transitory computer-readable storage medium; and
      a processor coupled to the non-transitory computer-readable storage medium and configured to control a plurality of modules to execute instructions of the non-transitory computer-readable storage medium to:
         obtain identifying information of a subject requesting optical coherence tomography (OCT) imaging via a device, wherein the device is disabled to prevent OCT measurements of the subject before the subject is positively authenticated based on the identifying information,
         process the identifying information in accordance with one or more programmable threshold values,
         generate unique pattern data based on the identifying information in response to detect the identifying information exceeding the one or more programmable threshold values,
         encrypt the unique pattern data, and
         transmit encrypted unique pattern data to a computing server system;
   wherein the computing server system is configured to:
      receive the encrypted unique pattern data from the first computing device,
      decrypt the encrypted unique pattern data,
      compare decrypted unique pattern data with a plurality of unique pattern data corresponding to authorized users of OCT imaging devices to determine whether the subject is authorized to use the device, and
      generate one or more signals to indicate whether the subject is authorized to use the device; and
   a second computing device deployed within the communication network and configured to remotely set or change imaging and scanning parameters of the device for the subject in response to detecting that the subject is positively authenticated to use the device based on the identifying information.

2. The system of claim 1, wherein the first computing device is implemented as a part of the device, or a stand-alone device deployed within the communication network and releasably attached to the device, or a part of a mobile device of the subject.

3. The system of claim 1, wherein the first computing device includes a fingerprint scanner configured to obtain images of one or more fingers of the subject.

4. The system of claim 1, wherein the first computing device includes a scanning device configured to obtain the identifying information of the subject stored on a third computing device, wherein the third computing device includes at least one of an identification card, a key fob, or a barcode with the identifying information of the subject stored thereon.

5. The system of claim 1, wherein the first computing device is further configured to obtain a unique identifier of the device and transmit the unique identifier to the computing server system.

6. The system of claim 1, wherein the first computing device is further configured to prompt the subject to provide at least one password to actuate the device.

7. The system of claim 1, wherein the identifying information of the subject comprise biometric or non-biometric characteristics of the subject including at least one of: a fingerprint, a palm/finger vein pattern, a voice pattern, a facial image, a palm print, a hand geometry, a retina and iris pattern, a digital signature, a username and password, and a token.

8. The system of claim 1, wherein the first computing device is further configured to store the encrypted unique pattern data of the subject and authenticate the subject based on saved encrypted unique pattern data.

9. The system of claim 1, wherein the computing server system is further configured to receive the OCT measurements of at least one of the subject's eyes from the device and transmit the OCT measurements to incorporate into data of the subject saved in an electronic medical/health record system based at least upon the identifying information of the subject.

10. The system of claim 1, wherein the second computing device is used by a physician to obtain and display one or more OCT images and measurements of the subject's eyes obtained from the device via the computing server system, wherein the second computing device is used by the physician to at least: change a scanning pattern of the device, the scanning pattern including at least a radial scan pattern and a raster scan pattern, or choose whether or not to perform an image averaging and how many repeat images to obtain and average over a given area, or identify a number of A-scans per B-scan, or a number of B-scans per C-scan.

11. The system of claim 1, wherein the device includes a self-imaging fundus camera or is self-actuated to measure visual acuity of the subject.

12. The system of claim 1, wherein the device is configured to measure intraocular pressure or perform OCT angiography (OCT-A).

13. A computer-implemented method, comprising:
obtaining, by a processor of a first computing device deployed within a communication network, identifying information of a subject requesting optical coherence tomography (OCT) imaging via a device;
disabling the device to prevent OCT measurements of the subject before the subject is positively authenticated based on the identifying information;
processing, by the first computing device, the identifying information in accordance with one or more programmable threshold values;
generating, by the first computing device, unique pattern data based on the identifying information in response to detect the identifying information exceeding the one or more programmable threshold values;
encrypting, by the first computing device, the unique pattern data;
transmitting, by the first computing device, encrypted unique pattern data to a computing server system;
receiving, by the computing server system, the encrypted unique pattern data from the first computing device;
decrypting, by the computing server system, the encrypted unique pattern data;
comparing, by the computing server system, decrypted unique pattern data with a plurality of unique pattern data corresponding to authorized users of OCT imaging devices to determine whether the subject is authorized to use the device;
generating, by the computing server system, one or more signals to indicate whether the subject is authorized to use the device; and
in response to detecting that the subject is positively authenticated to use the device based on the identifying information, remotely setting or changing, by a second computing device deployed within a communication network, imaging and scanning parameters of the device for the subject.

14. The computer-implemented method of claim 13, wherein the first computing device is implemented as a part of the device, or a stand-alone device deployed within the communication network and releasably attached to the device, or a part of a mobile device of the subject.

15. The computer-implemented method of claim 13, wherein the first computing device includes a fingerprint scanner configured to obtain images of one or more fingers of the subject.

16. The computer-implemented method of claim 13, wherein the first computing device includes a scanning device configured to obtain the identifying information of the subject stored on a third computing device, wherein the third computing device includes at least one of an identification card, a key fob, or a barcode with the identifying information of the subject stored thereon.

17. The computer-implemented method of claim 13, further comprising:
obtaining, by the first computing device, a unique identifier of the device; and
transmitting, by the first computing device, the unique identifier to the computing server system.

18. The computer-implemented method of claim 13, wherein the first computing device is further configured to prompt the subject to provide at least one password to actuate the device.

19. The computer-implemented method of claim 13, wherein the identifying information of the subject comprise biometric or non-biometric characteristics of the subject including at least one of: a fingerprint, a palm/finger vein pattern, a voice pattern, a facial image, a palm print, a hand geometry, a retina and iris pattern, a digital signature, a username and password, or a token.

20. The computer-implemented method of claim 13, further comprising:
storing, by the first computing device, the encrypted unique pattern data of the subject; and
authenticating, by the first computing device, the subject based on saved encrypted unique pattern data.

21. The computer-implemented method of claim 13, further comprising:
receiving, by the computing server system, the OCT measurements of at least one of the subject's eyes from the device; and
transmitting, by the computing server system, the OCT measurements to incorporate into data of the subject saved in an electronic medical/health record system based at least upon the identifying information of the subject.

22. The computer-implemented method of claim 13, further comprising:

obtaining, by the second computing device via the computing server system, one or more OCT images and measurements of the subject's eyes obtained from the device;
displaying, by the second computing device, the one or more OCT images and measurements of the subject's eyes;
controlling, via the second computing device by a physician, one or more device parameters of the device including at least one of: changing a scanning pattern of the device, the scanning pattern including at least a radial scan pattern and a raster scan pattern, choosing whether or not to perform an image averaging and how many images to obtain and average over a given area, or identifying a number of A-scans per B-scan, or a number of B-scans per C-scan.

* * * * *